(12) United States Patent
Miyamoto et al.

(10) Patent No.: US 7,470,885 B2
(45) Date of Patent: Dec. 30, 2008

(54) PHOTODETECTOR-AMPLIFIER CIRCUIT AND OPTICAL PICKUP DEVICE

(75) Inventors: Shinichi Miyamoto, Takatsuki (JP); Hideo Fukuda, Kyoto (JP)

(73) Assignee: Panasonic Corporation, Osaka (JP)

( * ) Notice: Subject to any disclaimer, the term of this patent is extended or adjusted under 35 U.S.C. 154(b) by 114 days.

(21) Appl. No.: 11/216,003

(22) Filed: Sep. 1, 2005

(65) Prior Publication Data
US 2006/0054789 A1    Mar. 16, 2006

(30) Foreign Application Priority Data
Sep. 13, 2004 (JP) .............................. 2004-265136

(51) Int. Cl.
*H03K 17/78* (2006.01)
*H03K 19/14* (2006.01)

(52) U.S. Cl. .................. 250/214 LS; 250/214 A; 250/214 LA; 372/38.08; 330/308

(58) Field of Classification Search .......... 250/214 LS, 250/214 A, 214 LA, 214 R, 201.5; 372/38.08; 330/308, 59, 110
See application file for complete search history.

(56) References Cited

U.S. PATENT DOCUMENTS

| | | | | |
|---|---|---|---|---|
| 5,068,526 A | * | 11/1991 | Hiroe | ................. 250/214 R |
| 5,430,290 A | | 7/1995 | Merle et al. | |
| 5,708,471 A | * | 1/1998 | Okumura | .................. 348/301 |
| 5,990,948 A | * | 11/1999 | Sugiki | ..................... 348/250 |
| 6,417,504 B1 | * | 7/2002 | Kozlowski | ............. 250/214 R |
| 6,476,954 B1 | * | 11/2002 | Nishizono | ................. 398/202 |
| 6,710,915 B2 | * | 3/2004 | Itoh | ......................... 359/333 |
| 6,747,264 B2 | * | 6/2004 | Miida | .................. 250/214 AG |
| 6,919,549 B2 | * | 7/2005 | Bamji et al. | ............. 250/208.1 |
| 7,102,117 B2 | * | 9/2006 | Hopper et al. | ........... 250/208.1 |
| 2003/0002552 A1 | * | 1/2003 | Nagara | .................... 372/38.02 |
| 2003/0231574 A1 | * | 12/2003 | Okuda et al. | .......... 369/124.12 |
| 2004/0065840 A1 | * | 4/2004 | Morishita | .............. 250/370.11 |
| 2006/0077271 A1 | * | 4/2006 | Watanabe | .................... 348/301 |
| 2006/0285563 A1 | * | 12/2006 | Hakomori | ................. 372/38.01 |

FOREIGN PATENT DOCUMENTS

| | | |
|---|---|---|
| JP | 3134723 | 2/1997 |
| JP | 10-107563 | 4/1998 |
| JP | 2001-202646 | 7/2001 |
| JP | 2004-104269 | 4/2004 |
| WO | WO 02/063761 A2 | 8/2002 |

OTHER PUBLICATIONS

Japanese Office Action issued in Japanese Patent Application No. JP 2005-265388, dated Feb. 5, 2008.

* cited by examiner

*Primary Examiner*—Seung C Sohn
(74) *Attorney, Agent, or Firm*—McDermott Will & Emery LLP (57) ABSTRACT

The present invention provides a photodetector-amplifier circuit capable of eliminating an influence of noise due to stray light entering a non-selected photodetector to stably select and switch a photodetector. The photodetector-amplifier circuit of the present invention comprises photodetectors 12 and 13. The photodetector 12 is connected via a switch 16 between an inverting input terminal of an operational amplifier 11 and GND, and is also connected via a switch 18 to a voltage source Vcc. The photodetector 13 is connected via a switch 17 to the inverting input terminal of the operational amplifier 11 and GND, and is also connected via a switch 19 to the voltage source Vcc.

10 Claims, 7 Drawing Sheets

PHOTODETECTOR-AMPLIFIER CIRCUIT AND OPTICAL PICKUP DEVICE

BACKGROUND OF THE INVENTION

1. Field of the Invention

The present invention relates to a photodetector-amplifier circuit and an optical pickup device. More particularly, the present invention relates to a photodetector-amplifier circuit and an optical pickup device which can switch a plurality of photo-detecting sections.

2. Description of the Background Art

Recently, as the packaging density, function, and operating speed of semiconductor integrated circuits have been improved, technology has also been developed in which a semiconductor integrated circuit is composed of a plurality of function circuits, and a function circuit to be operated is selected by switching ON or OFF a current supplied to each function circuit.

As an example of such technology, a photodetector-amplifier circuit will be described which is used in an optical pickup device of an optical disc drive to read a signal from an optical disc medium.

Optical disc drive apparatuses capable of recording data onto optical disc media, such as DVD, CD, and the like, are becoming wide spread. In an optical disc drive apparatus which performs both a data read operation and a data write operation, a laser light power for writing data onto an optical disc medium is different from a laser light power for reading data from the optical disc medium. Therefore, when the laser light powers are changed, the gain of the photodetector-amplifier circuit included in the optical pickup device needs to be switched in order that the output voltage falls within the output dynamic range of the amplifying circuit.

Figure 7:
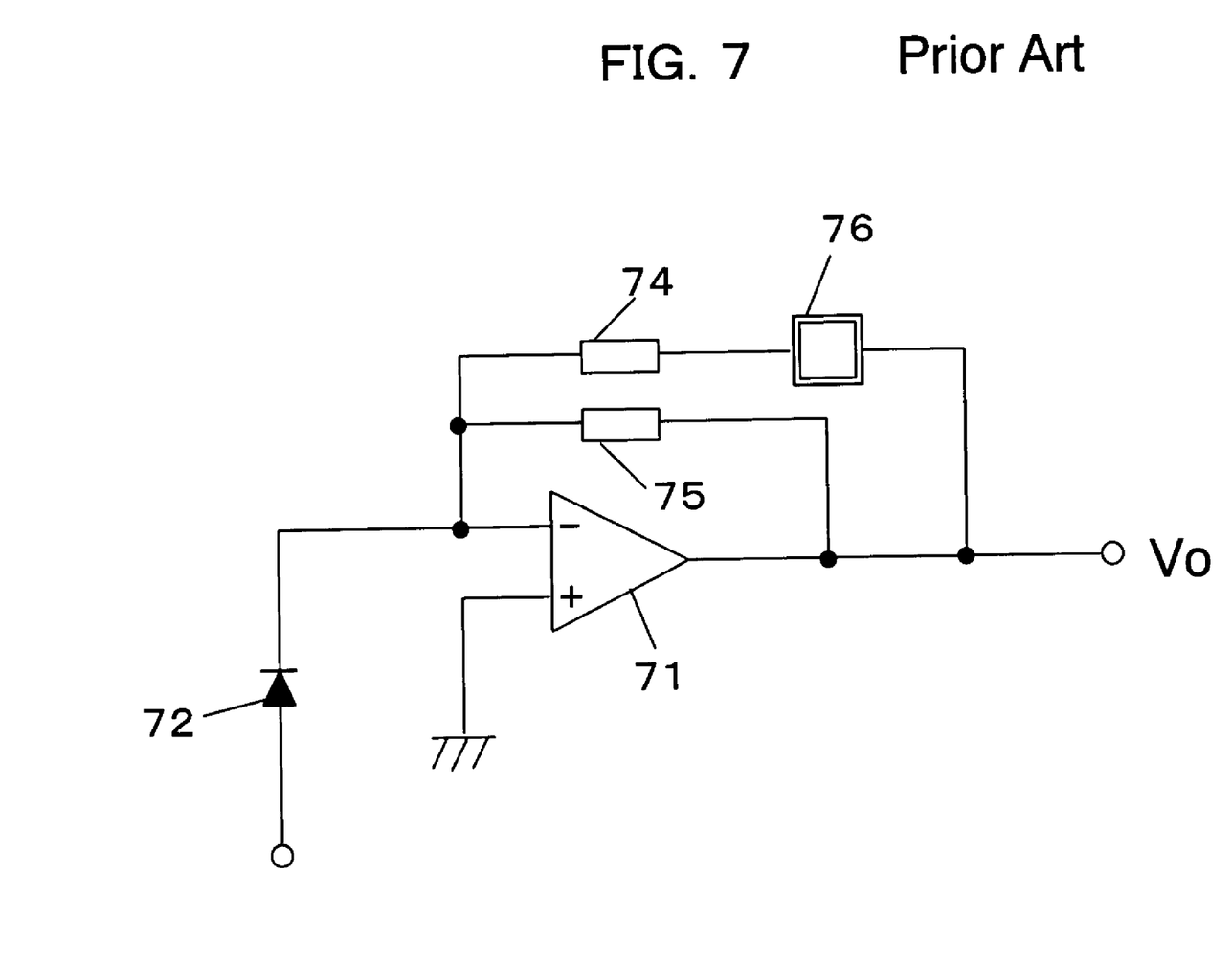
FIG. 7 is a diagram illustrating a conventional photodetector-amplifier circuit.

FIG. 7 is a diagram illustrating a conventional photodetector-amplifier circuit disclosed in Japanese Patent Laid-Open Publication No. H10-107563. As illustrated in FIG. 7, the output terminal of a photodetector 72 is connected to the inverting input terminal (−) of an operational amplifier 71. Gain resistors 74 and 75 are each connected in parallel between the inverting input terminal (−) and the output terminal of the operational amplifier 71 to form a negative feedback loop. More specifically, the gain resistor 75 is connected directly to the output terminal of the operational amplifier 71, while the gain resistor 74 is connected via an analog switch 76 to the output terminal of the operational amplifier 71.

According to the conventional photodetector-amplifier circuit of FIG. 7, the gain of the operational amplifier 71 can be switched by turning the analog switch 76 ON or OFF. When data is read from an optical disc medium, the power of laser light emitted from a light source is set to be small. In this case, by turning the analog switch 76 OFF, the gain of the operational amplifier 71 is set to be a high value due to the resistance of the gain resistor 75. On the other hand, when data is written onto an optical disc medium, the power of laser light emitted from the light source is set to be larger than when data is read. In this case, by turning the analog switch 76 ON, the gain of the operational amplifier 71 is regulated by the parallel addition of the resistances of the gain resistors 74 and 75, and therefore, is smaller than when data is read.

Recently, optical disc drive apparatuses capable of reading and writing data with respect to a plurality of types of optical disc media have also been known. For example, an optical disc drive apparatus supporting two disc specifications DVD and CD employs two laser light beams having different wavelengths, i.e., infrared light and red light, as light sources. In this case, an optical pickup device included in the optical disc drive apparatus comprises a plurality of photodetectors supporting respective light source wavelengths, and one of the photodetectors needs to be selected using a switch, depending on the type of an optical disc medium used.

To this end, a photodetector-amplifier circuit has been proposed in which the same number of analog switch circuits as that of photodetectors are provided between the photodetectors and an operational amplifier, and one of the photodetectors to be connected to the input terminal of the operational amplifier is selected, depending on the wavelength of a light source used. According to the photodetector-amplifier circuit thus proposed, the circuit size and the complication of the wiring layout can be reduced as compared to the photodetector-amplifier circuit in which operational amplifiers are separately connected to the respective photodetectors, and a photodetector is selected by turning the operational amplifiers ON or OFF.

The above-described photodetector-amplifier circuit comprising a plurality of photodetectors has the following problem.

The photodetector-amplifier circuit comprising a plurality of photodetectors and one operational amplifier further comprises a plurality of analog switches which connect the respective photodetectors and the input terminal of the amplifier. Using the analog switches, one of the photodetectors which is to be used is selected, and only the selected photodetector is electrically connected to the input terminal of the operational amplifier.

However, since the analog switch has a parasitic capacitance, a current path cannot be completely interrupted even when the switch is OFF. Therefore, when a photoelectric current occurs by stray light entering a photodetector which is not connected to an operational amplifier, the photoelectric current leaks into the operational amplifier via an analog switch which should interrupt the photodetector and the operational amplifier. As a result, the operational amplifier outputs a noise signal, leading to an unstable operation of the photodetector-amplifier circuit.

SUMMARY OF THE INVENTION

Therefore, an object of the present invention is to provide a photodetector-amplifier circuit and an optical pickup device which comprise a plurality of switchable photodetectors, and in which a signal is not output from an amplifying circuit when light enters a photodetector which is not electrically connected to the amplifying circuit, resulting in a stable operation.

A first aspect of the present invention is directed to a photodetector-amplifier circuit for outputting a voltage, depending on an intensity of incident light. The photodetector-amplifier circuit comprises a plurality of photo-detecting sections, an amplifying circuit, a plurality of first switches of connecting the corresponding respective photo-detecting sections and an input terminal of the amplifying circuit, and a plurality of second switches of connecting corresponding respective connection points between the first switches and the photo-detecting sections, and a predetermined voltage supplying point.

In this case, preferably, the first and second switches connected to the same connection point are operated in a complementary manner so that one of the switches is ON while the other is OFF, and the one is OFF while the other is ON.

Preferably, a potential of the voltage supplying point is set to be equal to an output offset voltage of the amplifying circuit.

More preferably, the potential of the voltage supplying point is a ground potential.

Each of the first and second switches may include any of a bipolar transistor, an analog MOS transistor, and a junction FET.

A second aspect of the present invention is directed to an optical pickup device for outputting a voltage, depending on an intensity of reflected light from an optical disc medium. The optical pickup device comprises a light source, a plurality of photo-detecting sections of receiving returning light which is output from the light source and is then reflected from the optical disc medium, an amplifying circuit, a plurality of first switches of connecting the corresponding respective photo-detecting sections and an input terminal of the amplifying circuit, and a plurality of second switches of connecting corresponding respective connection points between the first switches and the photo-detecting sections, and a predetermined voltage supplying point.

In this case, the light source may emit two or more light beams having different wavelengths.

More preferably, at least a portion of the returning light enters a different position, depending on a wavelength of the returning light.

More preferably, the first and second switches connected to the same connection point are operated in a complementary manner so that one of the switches is ON while the other is OFF, and the one is OFF while the other is ON.

More preferably, a potential of the voltage supplying point is set to be equal to an output offset voltage of the amplifying circuit.

More preferably, the potential of the voltage supplying point is a ground potential.

Each of the first and second switches may include any of a bipolar transistor, an analog MOS transistor, and a junction FET.

According to the photodetector-amplifier circuit and the optical pickup device of the present invention, even when a photoelectric current occurs in a photo-detecting section connected to an amplifying circuit, an output voltage of the amplifying circuit is not affected by the photoelectric current thus occurring, so that a stable amplifying operation is achieved.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the accompanying drawings.

First Embodiment

Figure 1:
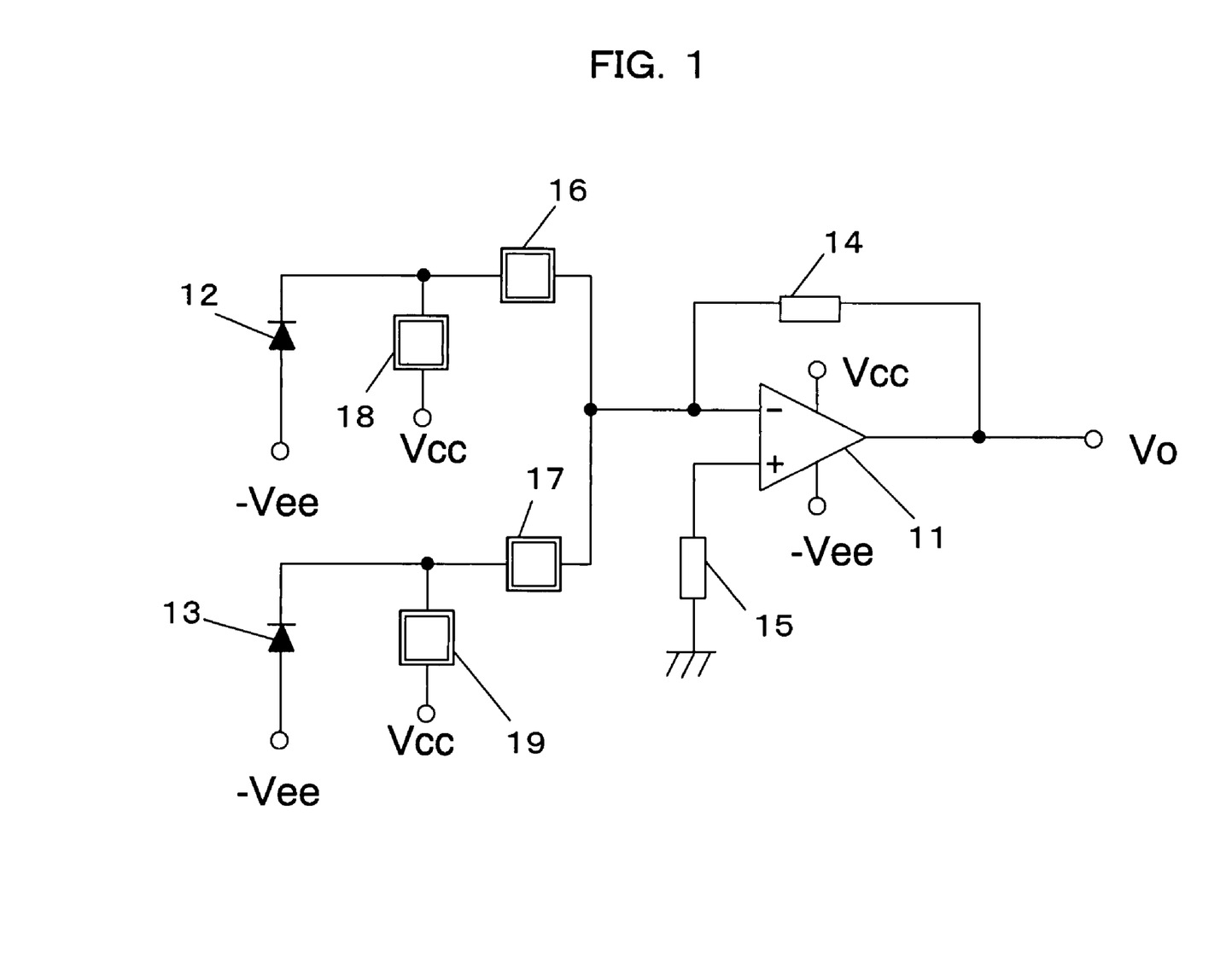
FIG. 1 is a diagram illustrating a photodetector-amplifier circuit according to a first embodiment of the present invention.

FIG. 1 is a diagram illustrating a photodetector-amplifier circuit according to a first embodiment of the present invention. The photodetector-amplifier circuit of FIG. 1 comprises an operational amplifier 11, photodetectors 12 and 13, switches 16 and 17, switches 18 and 19, a feedback resistor 14, and an impedance matching resistor 15.

The feedback resistor 14 is connected between an output terminal and an inverting input terminal (−) of the operational amplifier 11. The impedance matching resistor 15 is connected between a non-inverting input terminal (+) of the operational amplifier 11 and GND.

The photodetector 12 is connected via the switch 16 to the inverting input terminal (−) of the operational amplifier 11 and a negative voltage source Vee. A connection point between the photodetector 12 and the first switch 16 is connected via the switch 18 to a voltage source Vcc. The photodetector 13 is connected via the switch 17 to the inverting input terminal (−) of the operational amplifier 11 and the negative voltage source Vee. A connection point between the photodetector 13 and the switch 17 is connected via the switch 19 to the voltage source Vcc. Note that the voltage source Vcc may be supplied directly from a power source line.

Although the photodetector-amplifier circuit of the first embodiment comprises one operational amplifier 11 and two photodetectors 12 and 13 for the sake of simplicity, the photodetector-amplifier circuit may comprise three or more photodetectors. In the first embodiment, the switches 16 and 17 correspond to first switches, and the switches 18 and 19 correspond to second switches.

In the photodetector-amplifier circuit of FIG. 1, a pair of the switches 16 and 18 or a pair of the switches 17 and 19, which is connected to the same connection point, are operated in a complementary manner so that one of them is ON while the other is OFF, or the one is OFF while the other is ON. Hereinafter, this point will be described in detail.

Figure 2:
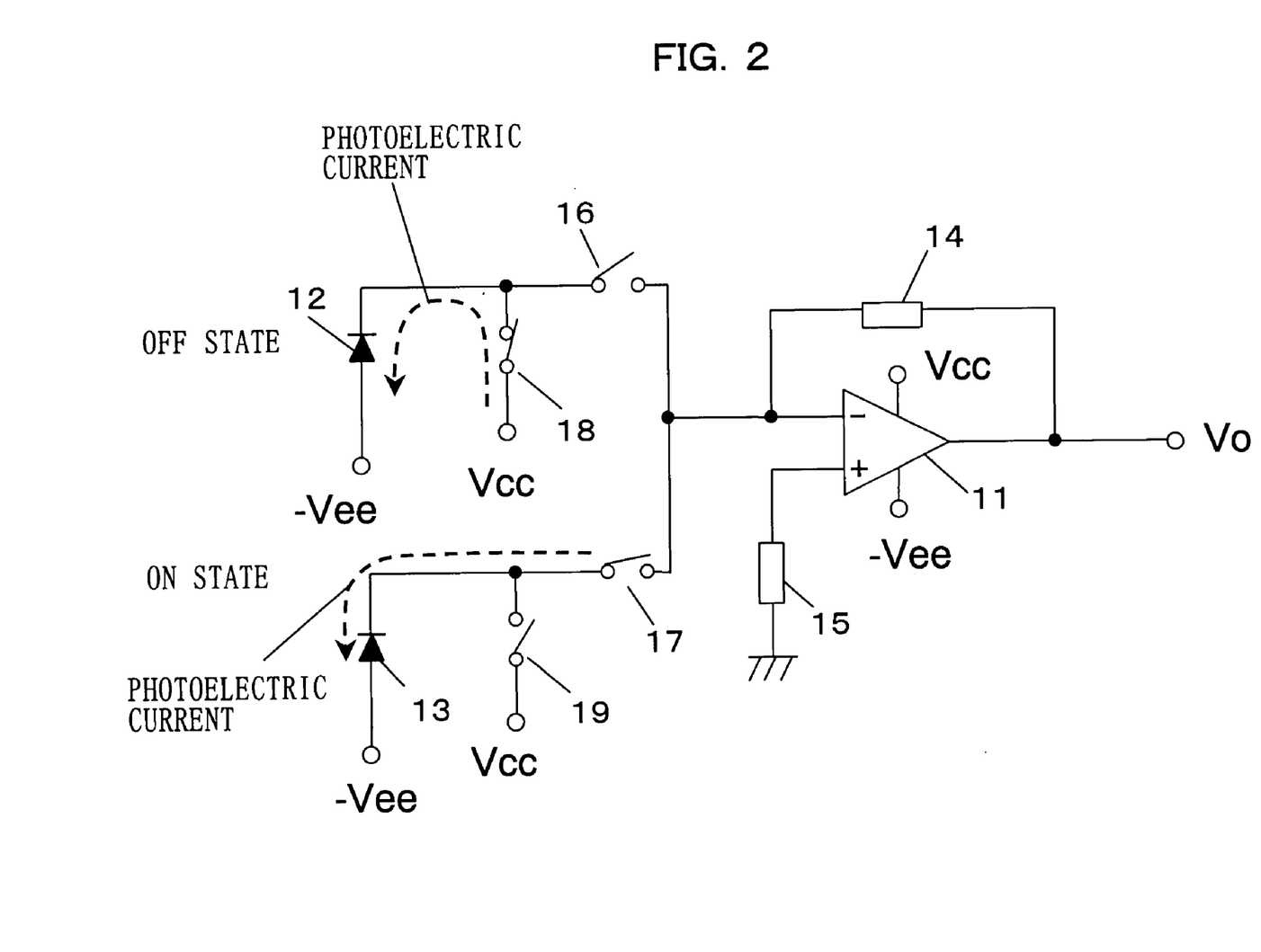
FIG. 2 is a diagram illustrating a switching operation of the photo-detecting section of the photodetector-amplifier circuit of FIG. 1.

FIG. 2 is a diagram illustrating a switching operation of the photo-detecting section of the photodetector-amplifier circuit of FIG. 1. In the example of FIG. 2, it is assumed that the photodetector 13 is selected. When the photodetector 13 is connected to the operational amplifier 11 by turning the switch 17 ON, the switch 19 connected to the same connection point as that of the switch 17 is OFF. Also, the switch 16 is OFF. The connection between the photodetector 12 and the operational amplifier 11 is interrupted. In this case, the switch 18 connected to the photodetector 12 is ON.

In this case, when stray light enters the photodetector 12 disconnected from the operational amplifier 11, a photoelectric current occurs. When the photoelectric current thus occurring leaks, for example, from the analog the switch 16 to the operational amplifier 11, the operational amplifier 11 outputs a voltage which should not be output, based on the leakage current, resulting in an unstable operation of the photodetector-amplifier circuit.

By contrast, according to the photodetector-amplifier circuit of the first embodiment, a predetermined voltage is applied from the voltage source Vcc to the photodetector 12.

When stray light enters the photodetector 12, a photoelectric current occurring in the photodetector 12 is supplied via the ON-state switch 18 from the voltage source Vcc. Therefore, a photoelectric current caused by stray light does not flow through the feedback resistor 14 of the amplifying circuit, so that the operational amplifier 11 is avoided from operating erroneously. Therefore, the photodetector-amplifier circuit of the first embodiment can operate stably without outputting an influence, such as noise or the like.

Since the signal input to the operational amplifier 11 is a current signal, elements constituting the switches 16 to 19 more preferably include any of, for example, a bipolar transistor, an analog MOS transistor, a junction FET, and the like.

Second Embodiment

Figure 3:
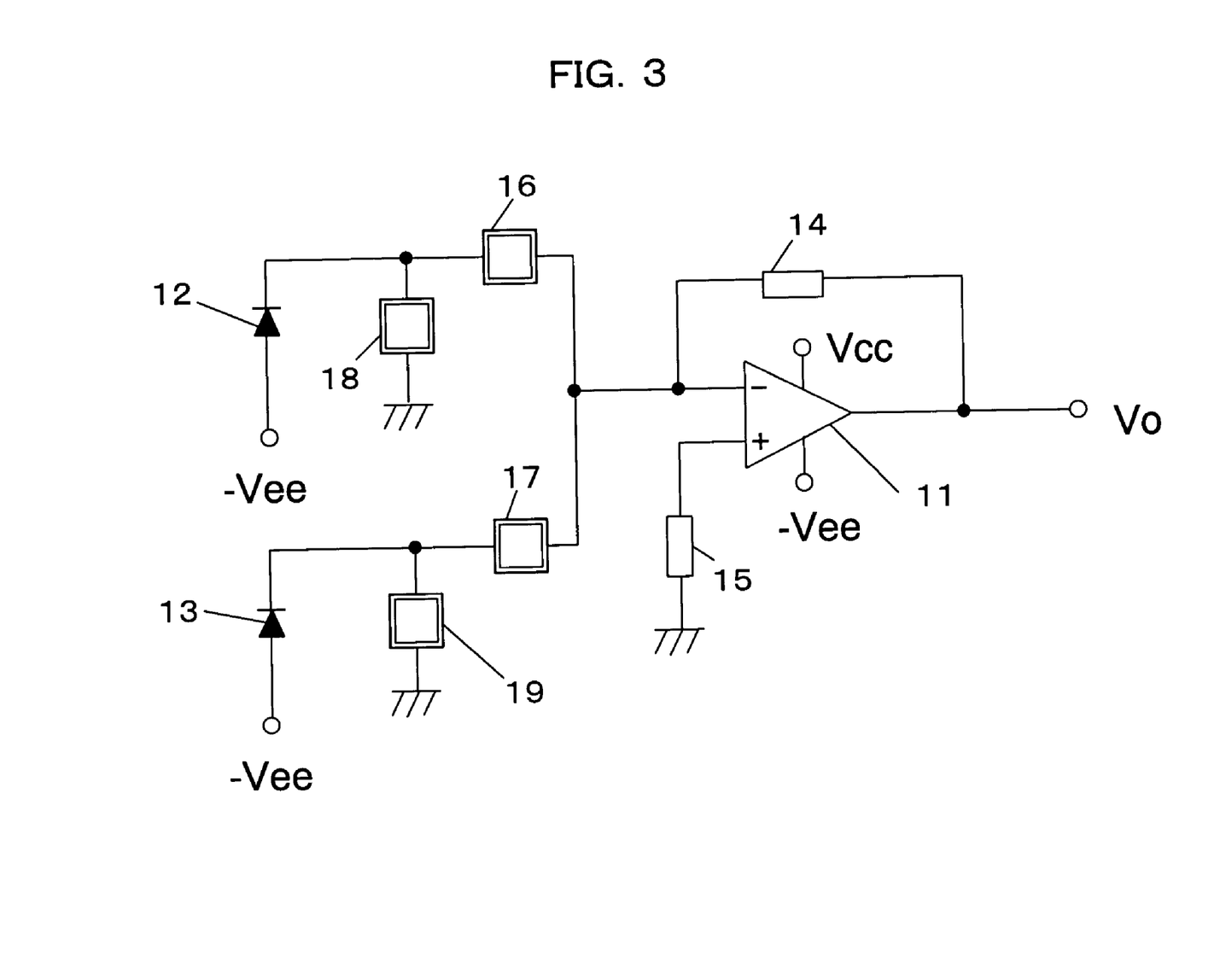
FIG. 3 is a diagram illustrating a photodetector-amplifier circuit according to a second embodiment of the present invention.

FIG. 3 is a diagram illustrating a photodetector-amplifier circuit according to a second embodiment of the present invention. The photodetector-amplifier circuit of the second embodiment has a basic structure similar to that of the first embodiment, and therefore, a difference therebetween will be hereinafter mainly described.

In the photodetector-amplifier circuit of FIG. 3, switches 18 and 19 are connected to a voltage source which is equal to an output offset voltage. More specifically, the switches 18 and 19 of the second embodiment are connected to GND.

According to the photodetector-amplifier circuit of the second embodiment, even when a switch 16 and the switch 18 are simultaneously turned ON, depending on a delay time between the switches 16 and 18 during the switching operation, a voltage input to an operational amplifier 11 at that moment is substantially equal to the output offset voltage. Therefore, at the moment when the switches 16 and 18 are simultaneously turned ON, substantially no input transient current flows into the operational amplifier 11. Therefore, the operational amplifier 11 is not saturated with the input transient current, resulting in a high-speed switching operation.

Figure 4:
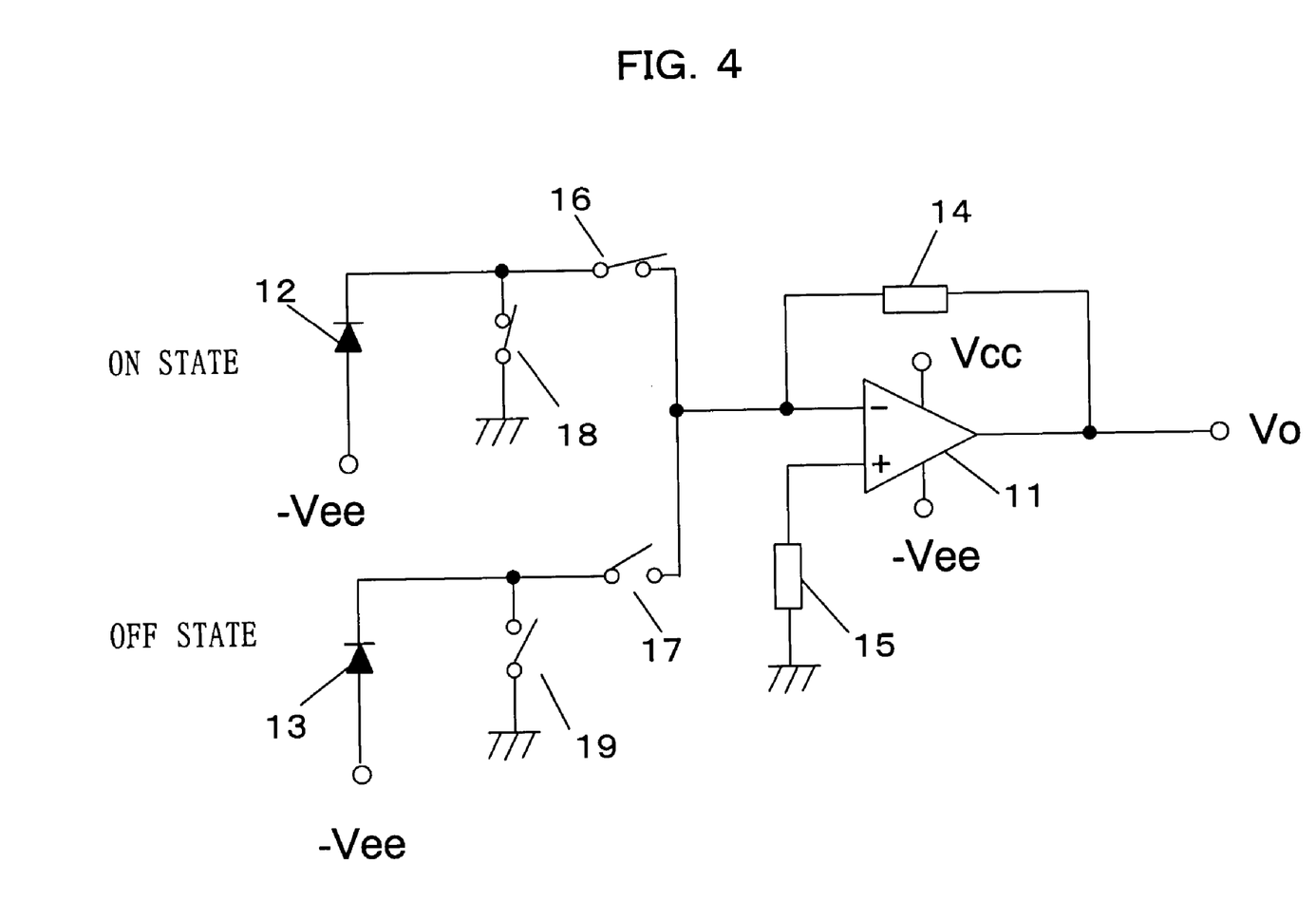
FIG. 4 is a diagram illustrating a switching step performed by the photo-detecting section of the photodetector-amplifier circuit of FIG. 3.

FIG. 4 is a diagram illustrating a switching step performed by the photo-detecting section of the photodetector-amplifier circuit of FIG. 3. As illustrated in FIG. 4, it is assumed that the switch 16 and the switch 18, which are connected to the photodetector 12 disconnected from the operational amplifier 11, are simultaneously turned ON. In this case, a potential of the inverting input terminal (−) of the operational amplifier 11 becomes equal to a ground potential. A potential of the non-inverting input terminal (+) of the operational amplifier 11 is also substantially equal to the ground potential, so that an output voltage Vo of the operational amplifier 11 is not transiently saturated during the switching operation. Therefore, according to the photodetector-amplifier circuit of the second embodiment, it is possible to prevent an erroneous operation of the amplifying circuit itself and achieve a stable switching operation.

Third Embodiment

Figure 5:
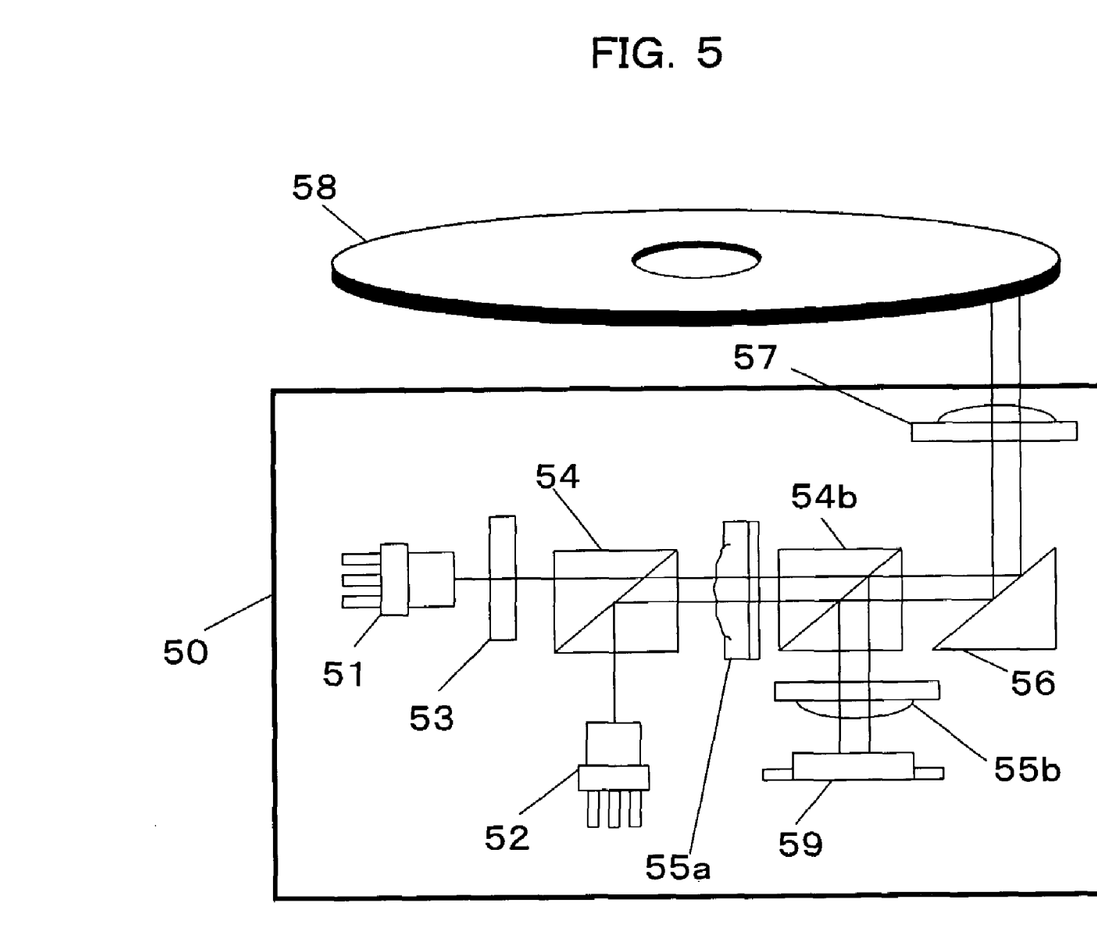
FIG. 5 is a diagram illustrating an exemplary optical pickup device according to a third embodiment of the present invention.

FIG. 5 is a diagram illustrating an exemplary optical pickup device according to a third embodiment of the present invention. It is assumed that the optical pickup device 50 of the third embodiment supports two disc specifications DVD and CD for the sake of simplicity. Note that the optical pickup device of the third embodiment may be used in an optical disc drive apparatus supporting disc specifications other than DVD and CD.

The optical pickup device 50 of FIG. 5 comprises an infrared laser 51 which is a light source for CD and a red laser 52 which is a light source for DVD. Further, the optical pickup device 50 includes a 3-beam grating 53, beam splitters 54*a* and 54*b*, collimator lenses 55*a* and 55*b*, a mirror 56, an objective lens 57, and a light receiving IC 59.

Firstly, an operation of the optical pickup device of the third embodiment when an optical disc medium 58 is a CD will be described. Laser light emitted by the infrared laser 51 for CD is split into three beams by the 3-beam grating 53. Each of the split beams passes through the beam splitter 54*a*, the collimator lens 55*a*, and the beam splitter 54*b* in sequence, and is then reflected from the mirror 56. Each beam reflected from the mirror 56 enters the objective lens 57.

Each beam condensed by the objective lens 57 is reflected from a recording surface of the optical disc medium 58 (CD). Each beam reflected from the optical disc medium 58 passes through the objective lens 57 and the mirror 56, and then enters the beam splitter 54*b*. The traveling direction of the reflected light is bent by the beam splitter 54*b*, so that the reflected light passes through the collimator lens 55*b* and then enters a light receiving surface of the light receiving IC 59.

The light receiving IC 59 comprises a photodetector-amplifier circuit in which a plurality of photodetectors (not shown), an operational amplifier (not shown) which amplifies a photoelectric current occurring in each photodetector, and a computing circuit (not shown) which processes an output signal from the operational amplifier are formed on the same substrate. Each photodetector is connected to the operational amplifier and a predetermined voltage source via a first switch and a second switch, as in the photodetector-amplifier circuit of the first or second embodiment.

Light returning from the optical disc medium 58 contains information about a pit formed on the recording surface of the optical disc medium 58. Therefore, the light receiving IC 59 performs a predetermined computation based on a photoelectric current which occurs in a photodetector to obtain an information signal recorded on the optical disc medium 58, a focus error signal, a tracking error signal, and the like. The signals obtained by the light receiving IC 59 are used so as to read information from the optical disc medium 58 or control a position of the optical pickup device 50.

Next, an operation of the optical pickup device of the third embodiment when an optical disc medium 58 is a DVD will be described. Laser light emitted from the red laser 52 which is a light source for DVD passes through the beam splitter 54*a*, the collimator lens 55*a*, and the beam splitter 54*b*, and is then reflected from the mirror 56. The light reflected from the mirror 56 enters the objective lens 57. The light condensed by the objective lens 57 is reflected from a recording surface of the optical disc medium 58 (DVD), and then passes through the objective lens 57, the mirror 56, and the beam splitter 54*b*, and is then brought onto the light receiving surface of the light receiving IC 59. A current signal generated by light returning from the optical disc medium 58 is used so as to read recorded information or control the position of the optical pickup device 50, as in the case of CD. Note that, when the optical disc medium 58 is a CD, laser light is split into three beams, and when the optical disc medium 58 is a DVD, laser light is a single beam. Therefore, light returning from the optical disc medium 58 is brought onto different positions on the light receiving surface of the light receiving IC 59 between CD and DVD.

Therefore, a photodetector which is used to read information from a CD and a photodetector which is used to read information from a DVD have different characteristics from each other.

In the optical pickup device 50 of the third embodiment, concerning an optical path from the beam splitter 54*a* via the recording surface of an optical disc medium to the light receiving IC 59, an optical axis of laser light emitted by the infrared laser 51 and an optical axis of laser light emitted by the red laser 52 are adjusted to substantially coincide with each other. Therefore, the two light sources can share an optical element(s) and a light receiving system provided on the optical path, so that the optical pickup device 50 can be easily miniaturized. In addition, assembly adjustment or the like can be easily performed for the optical pickup device 50.

According to the optical pickup device 50 of the third embodiment, red laser light and infrared laser light returning from the optical disc medium 58 are brought onto different spots on the light receiving IC 59. Therefore, when photodetectors are provided at the corresponding respective irradiated spots on the light receiving IC 59, the photodetectors can be switched, depending on the type (e.g., DVD or CD) of the optical disc medium 58. The light receiving IC 59 comprises the photodetector-amplifier circuit of the first or second embodiment. Therefore, even if stray light enters a photodetector which is not selected, a noise signal is not input from the non-selected photodetector to the operational amplifier. Therefore, the photodetectors can be stably switched, depending on the type of the optical disc medium 58, while using the common optical system of the optical pickup device 50.

Figure 6:
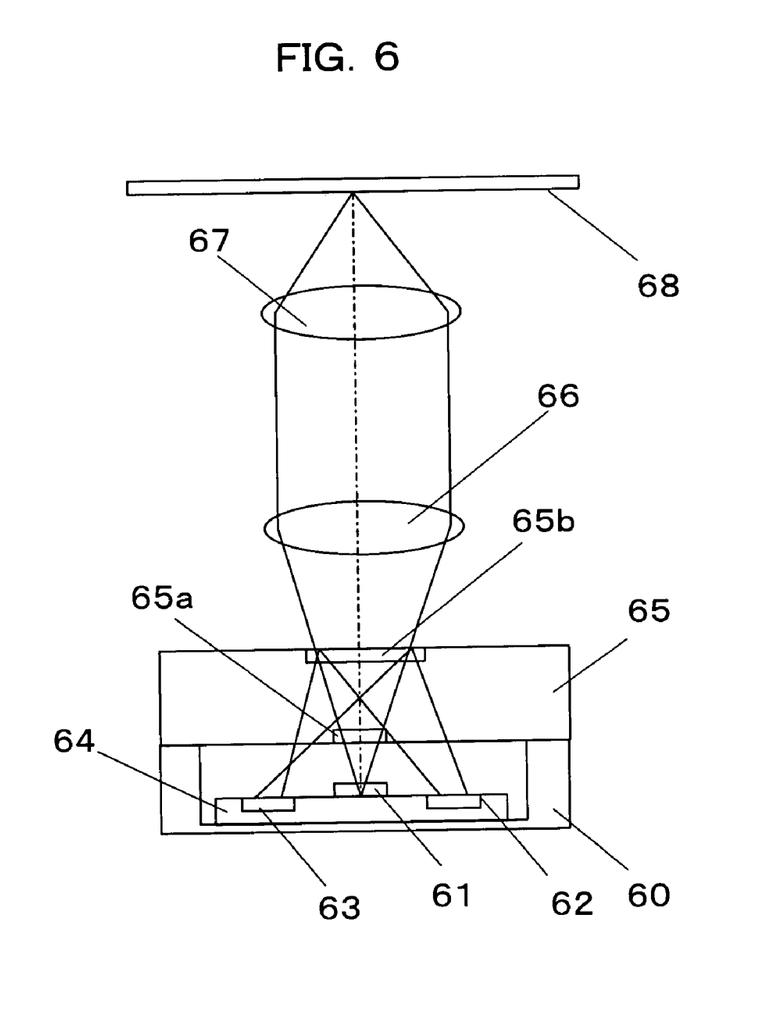
FIG. 6 is a diagram illustrating another exemplary optical pickup device according to the third embodiment of the present invention.

FIG. 6 is a diagram illustrating another exemplary optical pickup device according to the third embodiment of the present invention. The optical pickup device of FIG. 6 comprises a semiconductor laser element 61, a silicon substrate 64, an optical element 65, a collimator lens 66, and an objective lens 67. The semiconductor laser element 61 and the silicon substrate 64 are housed in a package 60.

The semiconductor laser element 61 is an element on which elements outputting lasers having different wavelengths (e.g., a red laser and an infrared laser) are monolithically integrated.

Photodetectors 62 and 63 are formed at different positions on a surface of the silicon substrate 64. Further, on the silicon substrate 64, an operational amplifier, switches, a computing circuit, and the like (not shown) are formed. As in the first or second embodiment, the photodetectors 62 and 63 are connected via the switches to the operational amplifier and a predetermined voltage source.

Further, on a lower surface of the optical element 65, a diffraction grating 65a is formed opposing the semiconductor laser element 61. On an upper surface of the optical element 65, a hologram 65b is formed.

A beam emitted from the semiconductor laser element 61 is reflected from a mirror (not shown) formed on the silicon substrate 64, and then enters the diffraction grating 65a. The emitted light is diffracted and divided by the diffraction grating 65a into a main beam (zeroth-order diffracted light) which is used to read out information and a sub-beam (±first-order diffracted light) which is used to detect a tracking error signal. Each of the divided beams passes through the hologram 65b, the collimator lens 66, and the objective lens 67, and is then brought onto a recording surface of an optical disc medium 68. Each beam is reflected from the optical disc medium 68, is then transmitted through the objective lens 67 and the collimator lens 66, and then enters the hologram 65b. Returning light is diffracted by the hologram 65b, and the resultant ±first-order diffracted light is introduced into the photodetectors 62 and 63.

The computing circuit formed on the silicon substrate 64 performs a predetermined computation based on a photoelectric current which occurs in each of the photodetectors 62 and 63 to detect an information signal recorded on the optical disc medium 68, a focus error signal, a tracking error signal, and the like.

In the example of FIG. 6, reflected light beams having different wavelengths are diffracted by the common hologram 65b, and are then brought onto the respective photodetectors. A diffraction angle attained by the hologram 65b varies depending on the wavelength of light. Therefore, the photodetector 62 or the photodetector 63 is used, depending on the disc specification (e.g., DVD or CD) of the optical disc medium 68.

Each of the photodetectors 62 and 63 is connected to an operational amplifier as in the first or second embodiment. Therefore, the optical pickup device of this variation can have an effect similar to that of FIG. 5. Specifically, when stray light enters a photodetector which is not selected, a noise signal is suppressed from being input from the non-selected photodetector to the operational amplifier, thereby achieving stable switching of photodetectors.

Although the structure and arrangement of parts, such as lasers, a light receiving IC, and the like, are specified in the above-described embodiments, those may be changed as appropriate, depending on the design. For example, the photodetector, the amplifying circuit, and the computing circuit may be formed on the same or different substrates or chips.

The photodetector-amplifier circuit and the optical pickup device of the present invention can stably switch a plurality of photodetectors, depending on a difference in a recording or reproducing operation between optical disc media, or a difference in specification between optical disc media, such as DVD and CD, and therefore, are useful for various optical pickup devices and the like.

While the invention has been described in detail, the foregoing description is in all aspects illustrative and not restrictive. It is understood that numerous other modifications and variations can be devised without departing from the scope of the invention.

What is claimed is:

1. A photodetector-amplifier circuit for outputting a voltage, depending on an intensity of incident light, comprising:
    a plurality of photo-detecting sections;
    an amplifying circuit;
    a plurality of first switches for connecting the corresponding respective photo-detecting sections and an input terminal of the amplifying circuit; and
    a plurality of second switches for connecting corresponding respective connection points between the first switches and the photo-detecting sections, and a predetermined voltage supplying point, wherein,
    the first switches are operated so that one of the first switches is ON while the rest of the first switches are OFF,
    the first and second switches connected to a same connection point are operated in a complementary manner so that one of the switches is ON while the other switch is OFF and so that the one of the switches is OFF while the other switch is ON, and
    when stray light enters a photo-detecting section connected to one of the rest of the first switches, the corresponding predetermined voltage supplying point supplies a photoelectric current to said photo-detecting section.

2. The photodetector-amplifier circuit according to claim 1, wherein a potential of the voltage supplying point is set to be equal to an output offset voltage of the amplifying circuit.

3. The photodetector-amplifier circuit according to claim 1, wherein a potential of the voltage supplying point is a ground potential.

4. The photodetector-amplifier circuit according to claim 1, wherein each of the first and second switches includes any of a bipolar transistor, an analog MOS transistor, and a junction FET.

5. An optical pickup device for outputting a voltage, depending on an intensity of reflected light from an optical disc medium, comprising:

a light source;

a plurality of photo-detecting sections for receiving returning light which is output from the light source and is then reflected from the optical disc medium;

an amplifying circuit;

a plurality of first switches for connecting the corresponding respective photo-detecting sections and an input terminal of the amplifying circuit; and a plurality of second switches for connecting corresponding respective connection points between the first switches and the photo-detecting sections, and a predetermined voltage supplying point, wherein, the first switches are operated so that one of the first switches is ON while the rest of the first switches are OFF, the first and second switches connected to a same connection point are operated in a complementary manner so that one of the switches is ON while the other switch is OFF and so that the one of the switches is OFF while the other switch is ON, and when stray light enters a photo-detecting section connected to one of the rest of the first switches, the corresponding predetermined voltage supplying point supplies a photoelectric current to said photo-detecting section.

6. The optical pickup device according to claim 5, wherein the light source emits two or more light beams having different wavelengths.

7. The optical pickup device according to claim 6, wherein at least a portion of the returning light enters a different position, depending on a wavelength of the returning light.

8. The optical pickup device according to claim 5, wherein a potential of the voltage supplying point is set to be equal to an output offset voltage of the amplifying circuit.

9. The optical pickup device according to claim 5, wherein a potential of the voltage supplying point is a ground potential.

10. The optical pickup device according to claim 5, wherein each of the first and second switches includes any of a bipolar transistor, an analog MOS transistor, and a junction FET.

* * * * *